US012569028B2

(12) United States Patent
Osaki et al.

(10) Patent No.: US 12,569,028 B2
(45) Date of Patent: Mar. 10, 2026

(54) SHOE MEMBER AND SHOE

(71) Applicant: ASICS CORPORATION, Kobe (JP)

(72) Inventors: Takashi Osaki, Kobe (JP); Tatsuro Tanabe, Kobe (JP)

(73) Assignee: ASICS CORPORATION, Kobe (JP)

( * ) Notice: Subject to any disclaimer, the term of this patent is extended or adjusted under 35 U.S.C. 154(b) by 862 days.

(21) Appl. No.: 17/788,676

(22) PCT Filed: Dec. 27, 2019

(86) PCT No.: PCT/JP2019/051485
§ 371 (c)(1),
(2) Date: Jun. 23, 2022

(87) PCT Pub. No.: WO2021/131034
PCT Pub. Date: Jul. 1, 2021

(65) Prior Publication Data
US 2023/0040111 A1 Feb. 9, 2023

(51) Int. Cl.
| | |
|---|---|
| *A43B 13/04* | (2006.01) |
| *C08L 53/02* | (2006.01) |
| *C08L 75/04* | (2006.01) |
| *C08L 101/12* | (2006.01) |

(52) U.S. Cl.
CPC ............ *A43B 13/04* (2013.01); *C08L 53/025* (2013.01); *C08L 75/04* (2013.01); *C08L 101/12* (2013.01); *C08L 2203/00* (2013.01); *C08L 2205/025* (2013.01)

(58) Field of Classification Search
CPC ....... A43B 13/04; C08L 53/025; C08L 75/04; C08L 101/12; C08L 2203/00; C08L 2205/025; C08L 2205/03; C08G 2410/00
See application file for complete search history.

(56) References Cited

U.S. PATENT DOCUMENTS

| | | | |
|---|---|---|---|
| 9,260,540 B1 * | 2/2016 | Yan | ......................... C08F 36/06 |
| 2019/0375921 A1 * | 12/2019 | Lee | ........................... C08F 2/04 |
| 2020/0015546 A1 | 1/2020 | Nishi | |
| 2021/0122914 A1 * | 4/2021 | Gu | .......................... B32B 27/36 |

FOREIGN PATENT DOCUMENTS

| | | | |
|---|---|---|---|
| JP | 2006225580 A | * | 8/2006 |
| JP | 2009-091384 A | | 4/2009 |
| WO | 2016/031046 A1 | | 3/2016 |

OTHER PUBLICATIONS

English translation of JP 2006225580A (Year: 2006).*
Notice of Submission of Publications from the Third Party mailed by the Japanese Patent Office on Sep. 19, 2023, which corresponds to Japanese Patent Application No. 2021-566736 and is related to U.S. Appl. No. 17/788,676; with English language translation.
International Search Report issued in PCT/JP2019/051485; mailed Feb. 18, 2020.

* cited by examiner

*Primary Examiner* — Alicia Bland
(74) *Attorney, Agent, or Firm* — Studebaker Brackett PLLC

(57) ABSTRACT

A shoe member consisting of a material comprising a thermoplastic elastomer, wherein the material has a glass transition temperature Tg of no more than 10° C., a loss tangent tan δ of no less than 0.4 in a test of dynamic viscoelasticity, and a Δ tan δ, which is the amount of change of tan δ, of no less than 0.15 when strain is changed from 5% to 100%.

8 Claims, 10 Drawing Sheets

20

20a

20b (a)

(b)

(c)

SHOE MEMBER AND SHOE

TECHNICAL FIELD

The present invention relates to a shoe member and a shoe.

BACKGROUND ART

Lightweight and improvement of both static friction properties and dynamic friction properties are desired for shoe members such as an outsole used, for example, for bouldering shoes and climbing shoes.

A filler (e.g., $SiO_2$) needs to be mixed in conventional shoe members (e.g., soles) using rubber as the main component in order to obtain required mechanical properties (for example, tensile strength and wear resistance). However, the problem is that mixing a filler in the raw material of a shoe member increases the specific gravity of the material.

The coefficient of static friction of a shoe member using rubber as the main component is increased depending on the amount of filler mixed in the raw material and the state of dispersion of the filler. This is because when the amount of filler mixed is increased and the filler itself comes to have an aggregated structure, hysteresis loss ($\Delta$ tan $\delta$) generated due to deformation of the material is increased and static friction properties (coefficient of static friction: $\mu$s) on a rough surface is increased. However, when the amount of filler mixed is increased and the coefficient of dynamic friction is increased to some extent, the rate of increase of the coefficient of dynamic friction to the amount of filler mixed tends to be reduced (see the dotted line in FIG. 1). Thus, the method of increasing the amount of filler mixed in a shoe member using rubber as the main component has limits considering further improvement of both static friction properties and dynamic friction properties.

SUMMARY OF INVENTION

Technical Problem

In view of the above problem, an object of the present invention is to provide a shoe member that is lightweight and has both high coefficient of static friction and high coefficient of dynamic friction, by using a thermoplastic elastomer.

Solution to Problem

A shoe member consisting of a material comprising a thermoplastic elastomer, wherein
the material has
a glass transition temperature Tg of no more than 10° C.,
a loss tangent tan $\delta$ of no less than 0.4 in a test of dynamic viscoelasticity, and
a $\Delta$ tan $\delta$, which is the amount of change of tan $\delta$, of no less than 0.15 when strain is changed from 5% to 100%.

Advantageous Effects of Invention

In the present invention, using a material selected so that Tg, tan $\delta$ and $\Delta$ tan $\delta$ thereof are in a predetermined range enables providing a shoe member that is light weight and has both high coefficient of static friction and high coefficient of dynamic friction, by using a thermoplastic elastomer.

DESCRIPTION OF EMBODIMENTS

Figure 10:
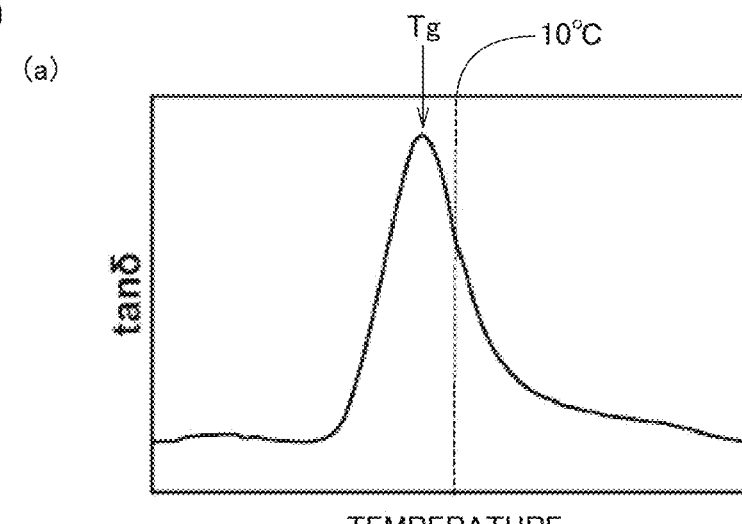
FIG. 10 is a schematic graph illustrating the range of Tg.
Figure 10:
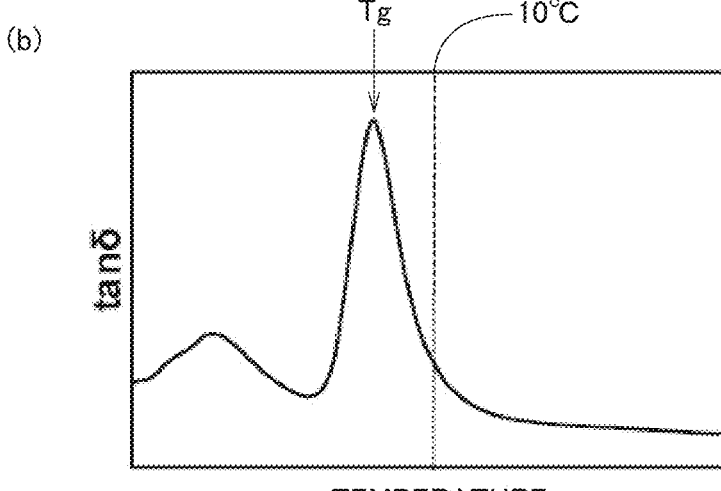
Figure 10:
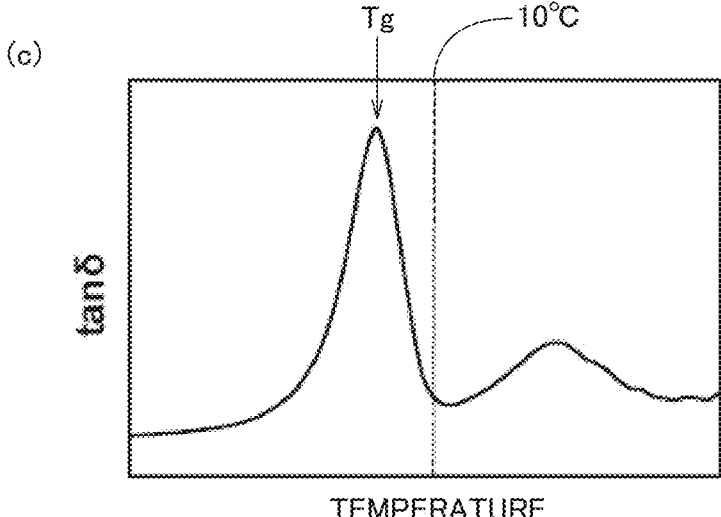

In the following, embodiments of the present invention will be described in detail with reference to figures. The same symbol is given to the same part or part in common in the figures and the description is not repeated.
<Shoe Member>
The shoe member of the present embodiment comprises a material comprising a thermoplastic elastomer.
(Material)
The material used in the present invention has a glass transition temperature Tg of no more than 10° C., preferably –60 to 5° C. and more preferably –50 to –30° C. (see FIG. 10(a)). When a plurality of polymers having a different Tg are blended, the resultant may have two or more Tgs (peaks of tan $\delta$). In that case, at least the base polymer (for example, a polymer constituting no less than 50% by mass of the material) has a Tg (the maximum peak of tan $\delta$) of preferably no more than 10° C., more preferably –60 to 5° C. and further preferably –50 to –30° C. (see FIG. 10(b), (c)).

The material has a loss tangent tan $\delta$ of no less than 0.4, and preferably 0.5 to 0.7 in a test of dynamic viscoelasticity.

The material has a $\Delta$ tan $\delta$, which is the amount of change of tan $\delta$, of no less than 0.15, and more preferably 0.2 to 0.4 when strain is changed from 5% to 100%.

Figure 1:
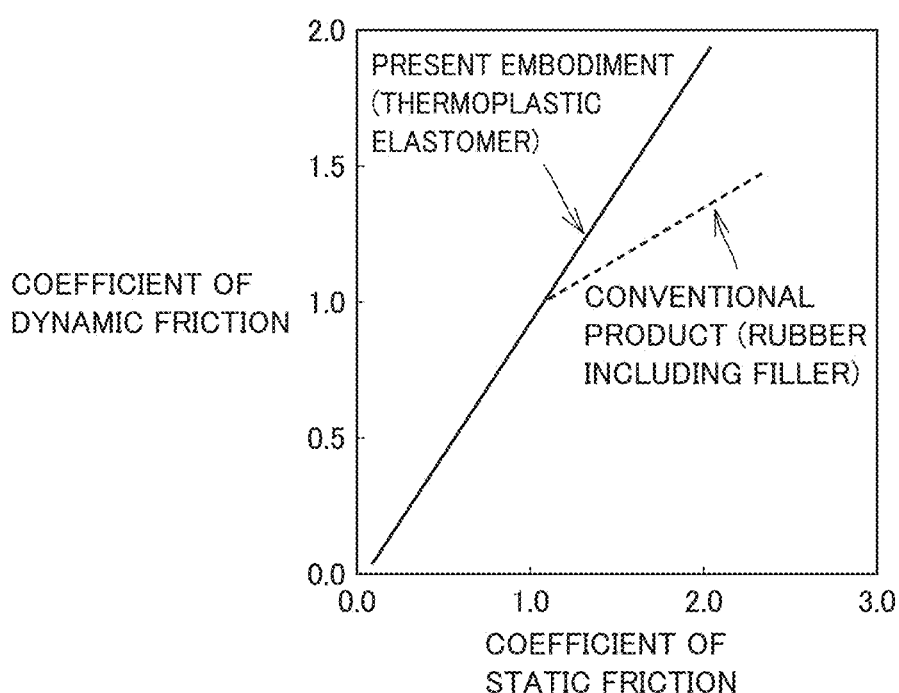
FIG. 1 is a schematic graph illustrating the relation between the coefficient of static friction and the coefficient of dynamic friction of a conventional shoe member and a shoe member according to an embodiment.

Referring to FIG. 1, the coefficient of static friction of a conventional shoe member using rubber as the main component is increased depending on the amount of filler mixed in the raw material. However, when the amount of filler mixed is increased and the coefficient of dynamic friction is increased to some extent, the rate of increase of the coefficient of dynamic friction to the amount of filler mixed tends to be reduced (see the dotted line in FIG. 1). On the other hand, both of static friction properties and dynamic friction properties can be improved in the shoe member of the present embodiment having the above predetermined properties (Tg, tan $\delta$ and $\Delta$ tan $\delta$) without using filler (see the solid line in FIG. 1).

For the shoe member of the present embodiment, an object is to provide a material having a complex modulus of elasticity (E) of no more than 50 MPa and a coefficient of static friction of no less than 1.8, which are in a different range from that of conventional shoe members.

Furthermore, the present inventors have found that, for a conventional shoe member in which a filler is blended and a thermoplastic elastomer (without a filler), there is a difference in the relation between tan δ and the coefficient of static friction. This suggests that the thermoplastic elastomer may be capable of providing both coefficient of static friction and coefficient of dynamic friction higher than those of rubber in which a filler is blended.

(Thermoplastic Elastomer)

Examples of thermoplastic elastomers used in the present embodiment include, but are not limited to, a styrene thermoplastic elastomer (a styrene elastomer), a thermoplastic polyurethane (TPU), an olefin polymer, an ethylene-vinyl acrylate copolymer and an ethylene-vinyl acetate copolymer. It is preferable that the thermoplastic elastomer includes a styrene thermoplastic elastomer or TPU. In that case, a material satisfying the above Tg, tan δ and Δ tan δ is expected to be easily obtained.

Examples of styrene thermoplastic elastomers include a styrene-ethylene-propylene-styrene copolymer (SEPS), a styrene-ethylene-ethylene-propylene-styrene copolymer (SEEPS), a styrene-ethylene-butylene-styrene copolymer (SEBS), a styrene-isoprene-styrene copolymer (SIS), a styrene-butadiene-styrene copolymer (SBS), a styrene-ethylene-butylene copolymer (SEB), a styrene-isobutylene-styrene copolymer (SIBS), a styrene-butadiene-styrene-butadiene copolymer (SBSB) and a styrene-butadiene-styrene-butadiene-styrene copolymer (SBSBS). It is preferable that the styrene thermoplastic elastomer is one of styrene elastomers, e.g., any one of SEPS, SEEPS and SEBS.

Examples of TPU include "ET870SH11UNJ" made by BASF and "ET1570A" made by BASF.

The material of the shoe member may also include a filler, a resin other than the thermosetting elastomer or rubber, a plasticizer, a reinforcing agent, a viscous liquid, a cross-linking agent and the like to the extent that the present invention is effective.

The material of the shoe member has a complex modulus of elasticity (E*) of preferably 4 to 70 MPa, and more preferably 10 to 50 MPa. This is because such hardness is desired to offer performance in use.

It is preferable that the material includes a viscous liquid. In this case, Δ tan δ of the material can be increased.

Examples of viscous liquids include liquid rubber and polymer oil. Examples of liquid rubbers include liquid styrene butadiene rubber (LSBR).

The ratio of mixing of the viscous liquid (e.g., liquid rubber) is preferably 1 to 30% by mass, and more preferably 5 to 25% by mass based on the total amount of the material.

It is preferable that the material includes a cross-linking agent. The cross-linking agent can prevent bleed due to viscous liquid when the material includes the viscous liquid.

The ratio of mixing of the cross-linking agent is preferably 0.05 to 1% by mass, and more preferably 0.1 to 0.5% by mass based on the total amount of the material.

Examples of cross-linking agents include DCP (dicumyl peroxide) and BIPB (di-(tert-butylperoxyisopropyl)benzene).

It is preferable that the shoe member (material) is transparent or semi-transparent. This allows the material to be used as a sole of shoes which emit light from a light source embedded, or improves design (appearance) of shoes.

It is preferable that the above material does not include a filler or the content of the filler is no more than 10 parts by mass per 100 parts by mass of the thermoplastic elastomer.

4

In this case, the specific gravity of the material can be no more than 1.0, making it easier to maintain transparency of the material.

The material of the shoe member has a specific gravity of preferably no more than 1.0 from the viewpoint of light weight of the shoe member. For example, in the case of climbing shoes, a large amount of a shoe member is used for the sole, and this greatly affects the weight of the shoes. Thus, light weight of the shoe member is expected to improve its performance. Light weight of the shoe member is also expected to improve performance of running shoes.

(Method for Preparing Shoe Member)

Friction force is known to be generated based on two parameters. The two parameters are the cohesion term and the hysteresis term. The cohesion term consists of contact areas and free surface energy. Basically, the frictional force can be increased by increasing the contact area by reducing the hardness of the material. When the surface energy of a material is close to the surface free energy of a material of the target coming into contact therewith, the frictional force between the material and the target is increased.

The hysteresis term (tan δ) is adjusted based on the balance among the type and the amount of polymer added, the type and the amount of filler added, the condition of the filler added (e.g., the state of dispersion and the aggregated structure of the filler), and the type and the amount of plasticizer added, and the like. When an elastic body has large tan δ, the consumption of energy for deformation is large when the body is deformed, and the frictional force is also increased.

The contact area of shoes is relatively small in walking or running on asphalt having many small irregularities, or rocks. In this case it is important to design materials considering the hysteresis term, in particular, in order to increase frictional force. Furthermore, the hysteresis term contributes more when the road is rough and wet.

Additivity works in viscoelasticity of polymer, and thus properties concerning viscoelasticity of materials to be blended (e.g., Tg, tan δ) can be roughly estimated from the added value obtained by weighting properties of resin materials with the weight ratio.

LSBR is a low molecular weight component having a styrene side chain, and thus Δ tan δ is increased by blending LSBR in polymer materials.

<Shoes>

The present invention also relates to a shoe comprising the above shoe member.

The general structure of a shoe according to the present embodiment will be described with reference to FIG. 7 and FIG. 8.

Figure 7:
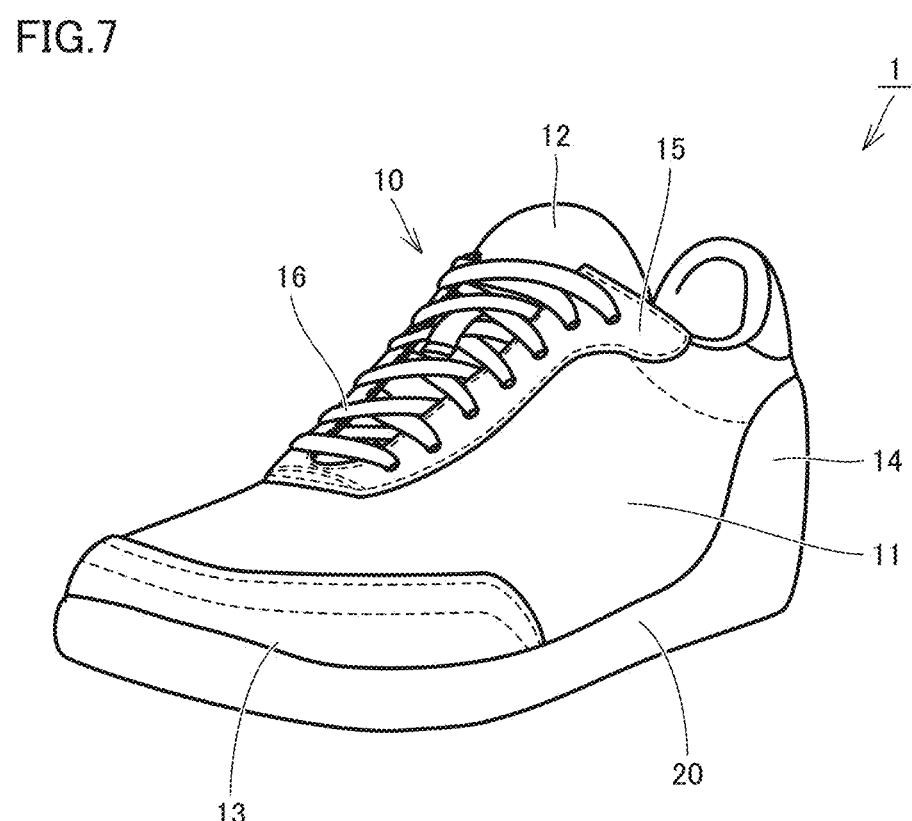
FIG. 7 is a perspective view illustrating a shoe comprising a shoe member according to an embodiment.

As shown in FIG. 7, a shoe 1 has an upper 10 and a sole 20. Upper 10 has a shape that covers the top of one's foot put therein. Sole 20 is located under upper 10 so as to cover the sole of the foot.

A sockliner may also be stored in upper 10 so that the sockliner covers the inner bottom of upper 10.

Upper 10 includes a main body of upper 11, a tongue of a shoe 12, a toe reinforcing part 13, a heel reinforcing part 14, an eyelet reinforcing part 15 and a shoelace 16. Of them, all of tongue of a shoe 12, toe reinforcing part 13, heel reinforcing part 14, eyelet reinforcing part 15 and shoelace 16 are fixed or attached to main body of upper 11.

A lower opening, which is covered with sole 20 is provided at the bottom of main body of upper 11. In another example, the lower end of main body of upper 11 is French seamed to form a bottom part (insole). In this case, to provide a bottom part at the bottom of main body of upper 11, the whole of main body of upper 11 may be previously formed into a bag by sock knitting or circular knitting instead of using French seam described above. An upper opening from which the upper ankle and part of the top of one's foot are exposed is provided at the upper portion of main body of upper 11. Tongue of a shoe 12 is fixed to main body of upper 11 by sewing, welding, bonding or by combining them so that tongue of a shoe 12 covers the portion, of the upper opening provided in main body of upper 11, from which part of the top of the foot is exposed. A woven fabric, a knitted fabric, synthetic leather, resin and the like are used for main body of upper 11 and tongue of a shoe 12, for example. A double raschel warp knitted fabric in which polyester yarn is knitted is used for shoes particularly requiring air permeability and light weight.

Toe reinforcing part 13 and heel reinforcing part 14 are provided in order to reinforce the portion covering the toe and the portion covering the heel in main body of upper 11, where durability is particularly required; they are located so as to cover the outer surface of those portions in main body of upper 11.

Eyelet reinforcing part 15 is provided in order to reinforce the periphery of the upper opening (where shoelace 16 is attached) provided in main body of upper 11 from which part of the top of the foot is exposed, where durability is particularly required as in toe reinforcing part 13 and heel reinforcing part 14. Eyelet reinforcing part 15 is located so as to cover the outer surface of that portion in main body of upper 11.

Toe reinforcing part 13, heel reinforcing part 14 and eyelet reinforcing part 15 are made of a woven fabric, a knitted fabric, leather, resin and the like fixed to the outer surface of main body of upper 11 by sewing, welding, bonding or by combining them.

Toe reinforcing part 13, heel reinforcing part 14 and eyelet reinforcing part 15 are not an essential component, and part or all of them may be omitted.

Shoelace 16 is a member in the form of strings that lace up, in the direction of the width of the foot, peripheries of the upper opening provided in main body of upper 11, from which part of the top of the foot is exposed. Shoelace 16 is inserted in holes formed in the periphery of the upper opening. Tightening shoelace 16 with one's foot in main body of upper 11 allows main body of upper 11 to be closely attached to the foot. Shoelace 16 is not an essential component, either, and shoes may have a structure in which the main body of upper is closely attached to the foot with a hook-and-loop faster. Alternatively, shoes may have a structure in which main body of upper 11 is in the form of a sock without a tongue so that main body of upper 11 is closely attached to the foot only by inserting the foot into main body of upper 11.

Sole 20 (outsole) is shaped substantially flat as a whole. Sole 20 has a contact surface 20b (see FIG. 8) at the bottom. In FIG. 7, sole 20 is integrated with heal reinforcing part 14, but the two may be separated.

An insole, which is not shown, is attached to main body of upper 11 so that it covers the lower opening of main body of upper 11 described above. More specifically, the insole is fixed to the lower periphery of main body of upper 11 by sewing. Furthermore, the insole is fixed to the top surface of sole 20 by bonding, welding and the like. The insole is made of a woven fabric, a knitted fabric or a nonwoven fabric composed of a synthetic resin fiber such as polyester, or a resin foaming material including a resin material, which is the main component, and a foaming agent or cross-linking agent, which is a secondary component. The insole may constitute part of sole 20 as described above, but is not essential, and shoes may not necessarily have the insole.

A sockliner, which is not shown, is stored in upper 10 as described above, and detachably attached to the inner bottom of upper 10 or fixed to the inner bottom of upper 10 by welding, bonding and the like. The sockliner is made of a woven fabric, a knitted fabric or a nonwoven fabric composed of a synthetic resin fiber such as polyester, or a resin foaming material including a resin material, which is the main component, and a foaming agent or cross-linking agent, which is a secondary component. The sockliner is put therein for the purpose of improving touch on the foot. The sockliner is not an essential component, and may not be provided.

Figure 8:
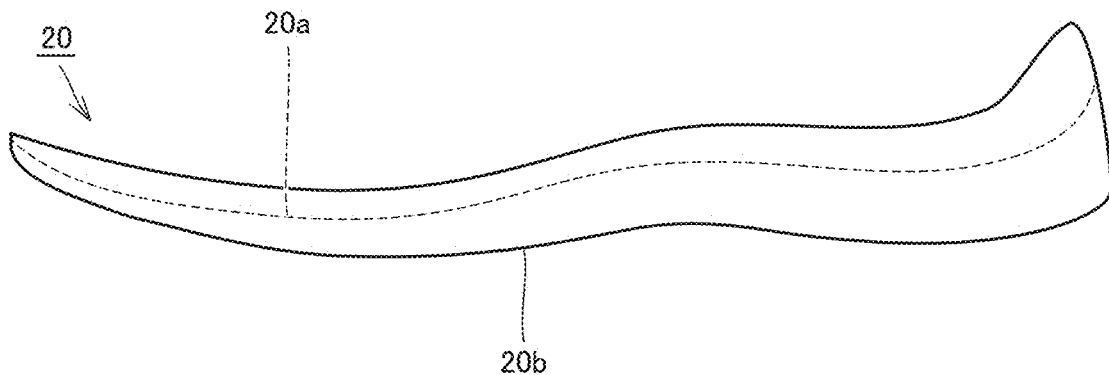
FIG. 8 is a side view of a sole of the shoe described in FIG. 7 viewed from the outside of the foot.

As shown in FIG. 8, sole 20 has an upper surface 20a and a contact surface 20b, which is the lower surface.

Sole 20 has a shape in which the periphery of upper surface 20a is raised higher than the surrounding, and thus upper surface 20a has a recessed portion. The recessed portion receives upper 10 and insole 3. Upper surface 20a excluding the above periphery, which is the bottom of the recessed portion, is smoothly curved so as to be fitted to the foot. Sole 20 may be flat without the recessed portion.

It is preferable that sole 20 (outsole) has excellent wear resistance and grip properties. Although not shown in the figure, irregularities may be formed on the exposed surface of contact surface 20b of sole 20 to have a tread pattern in order to improve grip properties.

The above shoe member is suitably used as an outsole of shoes. In other words, it is preferable that the shoe of the present embodiment comprises the shoe member as an outsole. In this case the performance of the outsole for which both static friction properties and dynamic friction properties are required can be improved.

The outsole herein means a sole constituting a portion in contact with a plane of contact such as a wall including a wall for climbing and a rock wall, the ground, a paved road and a floor. In the case of a sole having a single layer structure as described in FIG. 7 and FIG. 8, the entire sole may be composed of the above shoe member to form an outsole. When a sole has a two-layer structure of a midsole (having high shock absorbing properties) and an outsole, only the outsole may be composed of the above shoe member.

The summary of embodiments of the present invention is as follows.

(1) A shoe member consisting of a material comprising a thermoplastic elastomer, wherein the material has a glass transition temperature Tg of no more than 10° C., a loss tangent tan $\delta$ of no less than 0.4 in a test of dynamic viscoelasticity, and a $\Delta$ tan $\delta$, which is the amount of change of tan $\delta$, of no less than 0.15 when strain is changed from 5% to 100%.

Using a material selected so that Tg, tan $\delta$ and $\Delta$ tan $\delta$ thereof are in a predetermined range enables providing a shoe member that is light weight and has both high coefficient of static friction and high coefficient of dynamic friction by using a thermoplastic elastomer.

(2) The shoe member according to (1), wherein the material does not include a filler or the content of the filler is no more than 10 parts by mass per 100 parts by mass of the thermoplastic elastomer.

In this case, the specific gravity of the material can be no more than 1.0, making it easier to maintain transparency of the material.

(3) The shoe member according to (1) or (2), wherein the thermoplastic elastomer is a styrene thermoplastic elastomer or a thermoplastic polyurethane.

In that case, a material satisfying the above Tg, tan δ and Δ tan δ is expected to be easily obtained.

(4) The shoe member according to any one of (1) to (3), wherein the material includes a viscous liquid.

In this case, Δ tan δ of the material can be increased.

(5) The shoe member according to any of (1) to (4), wherein the shoe member has a coefficient of static friction of no less than 1.8 and a coefficient of dynamic friction of no less than 1.6.

A shoe member having both an excellent coefficient of static friction of no less than 1.8 and excellent coefficient of dynamic friction can be provided.

(6) The shoe member according to any of (1) to (5), which is transparent or semi-transparent.

This allows the material to be used as a sole of shoes which emit light from a light source embedded, or improves design (appearance) of shoes.

(7) The shoe member according to any of (1) to (6), wherein the shoe member is used as an outsole of a shoe.

In this case the performance of the outsole for which both static friction properties and dynamic friction properties are required can be improved.

(8) A shoe comprising the shoe member according to any of (1) to (7) as an outsole.

A shoe having an outsole for which both static friction properties and dynamic friction properties are required and whose performance has been improved can be provided.

EXAMPLES

Hereinafter, the present invention will be described in more detail by means of Examples, but the present invention is not limited thereto.

Example 1

A thermoplastic elastomer composed of a mixed resin of 83% by mass of SEPS ("Hybrar 7125" made by Kuraray Co. Ltd.) and 17% by mass of SEEPS ("Septon 4033" made by Kuraray Co. Ltd.) was prepared as shown in Table 1.

A material (shoe member) of Example 1 was prepared by using the above raw material.

Example 2

A material (shoe member) of Example 2 was prepared in the same manner as in Example 1 except for using s raw material having a composition of Example 2 shown in Table 1 (also including liquid styrene butadiene rubber (SBR)).

Example 3

A material (shoe member) of Example 3 was prepared in the same manner as in Example 2 except for using a raw material having the composition shown in Table 1 (also including a cross-linking agent).

Comparative Examples 1 to 4

A material of Comparative Examples 1 to 4 was prepared in the same manner as in Example 1 except for using a raw material having the composition of Comparative Examples 1 to 4 shown in Table 1.

[Evaluation] The samples of the materials prepared in the above Examples and Comparative Examples were evaluated as follows.

<Tg, Tan δ: Test of Dynamic Viscoelasticity>

Dynamic viscoelasticity (glass transition temperature: Tg, loss tangent: tan δ) of the respective samples was measured according to JIS K 6394 2007 using a dynamic viscoelasticity measuring device "Rheogel E4000" (made by UBM) under the following conditions.

(Measurement Conditions)

Thickness of sample: 2 mm

Width of sample: 5 mm

Distance between chucks (holders): 20 mm

Mode: sinusoidal strain, tension

Amount of strain: 0.025%

Measurement temperature: $-100°$ C. to $100°$ ° C.

Temperature increase: 3° C./minute

Figure 9:
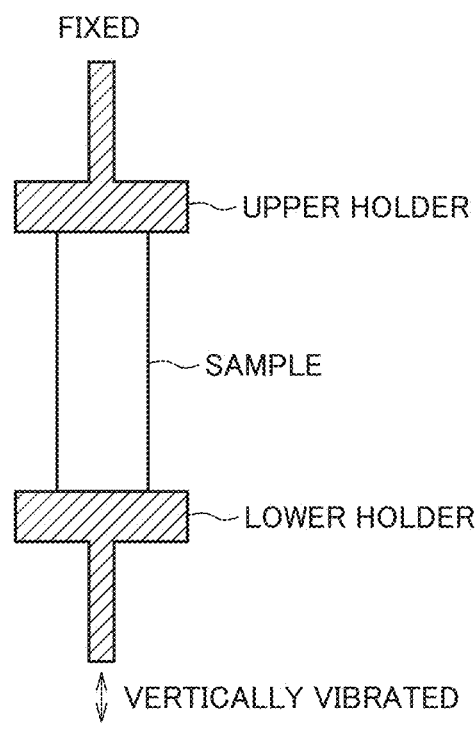
FIG. 9 is a schematic view illustrating the method for measuring dynamic viscoelasticity.

More specifically, referring to FIG. 9, both ends of the sample in the form of a strip were held by an upper holder and a lower holder, and the lower holder was vertically vibrated, and the viscoelasticity of the sample material was measured.

Figure 2:
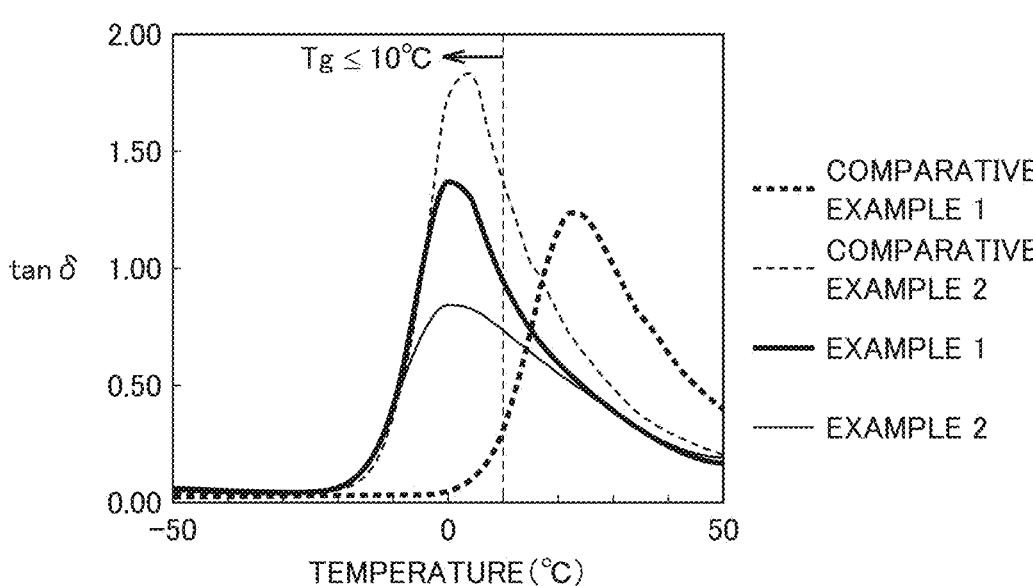
FIG. 2 is a graph showing the relation between temperature and tan $\delta$ of the materials of Examples 1, 2 and Comparative Examples 1, 2.

The glass transition temperature Tg (° C.) means the maximum value of the peak of tan δ in a temperature sweep analysis ($-100$ to $100°$ C.) under conditions of a frequency of 10 Hz and a strain of 0.025% (see FIG. 2). In this regard, tan δ is the value of tan δ at 25° C. Thus, Tg in the present invention is different from usual glass transition temperature (Tg) described in catalogs of manufacturers of polymer.

<Δ tan δ>

Δ tan δ of the samples was measured according to JIS K 6394 2007 using a viscoelasticity measuring device "DMA+ 300" (made by Metravib) under the following measurement conditions.

(Measurement Conditions)

Thickness of sample: 2 mm

Width of sample: 10 mm

Distance between chucks: 2 mm

Mode: sinusoidal strain, shear

Measurement temperature: 25° C.

Frequency: 2 Hz

Load: automatic static load

Strain: 0.05 to 100%, logarithm 31 plots

In the present invention, Δ tan δ is a value obtained by subtracting tan δ at a strain of 0.05% (tan 80.05) from tan δ at a strain of 100% (tan 8100) (see FIG. 3) and calculated by the following formula.

$$\Delta \tan \delta = \tan \delta_{100} - \tan \delta_{0.05}$$

<Complex Modulus of Elasticity E*>

Complex modulus of elasticity E* (MPa) was measured by using the same device as in the measurement of Tg and tan δ under conditions of sinusoidal strain, a tensile mode, 10 Hz, 0.025% strain and 25° C.

<Specific Gravity>

Specific gravity was measured by using MD-300S made by Alfa Mirage.

<Static Friction Properties, Dynamic Friction Properties>

Static friction properties and dynamic friction properties of the samples were evaluated.

More specifically, the coefficient of static friction ($\mu$s) and the coefficient of dynamic friction ($\mu$d) of the samples were measured by using a linear friction tester "$\mu$V-1000" (made by Trinity-Lab Inc.) under the following measurement conditions.

(Measurement Conditions)

Shape of specimen: 20 mm (width)×40 mm (depth)×2 mm (height)

Mean radius of curvature (R) of hold: 14 mm

Surface roughness of sample (Rz): 366 μm

Input load: 1,000 gf

Sliding speed: 10 mm/sec

Sliding distance: 10 mm

State of lubrication: Dry

Number of measurements: N3

More specifically, first the surface of the sample (a sheet of the respective materials) is uniformly polished with a polishing paper (#400). Next, 10 seconds after applying load to the sample, the sample was started to be slid against a climbing hold (rough surface) in the direction of sliding as shown in FIG. 6, and the coefficient of friction was measured (see FIG. 5).

Figure 5:
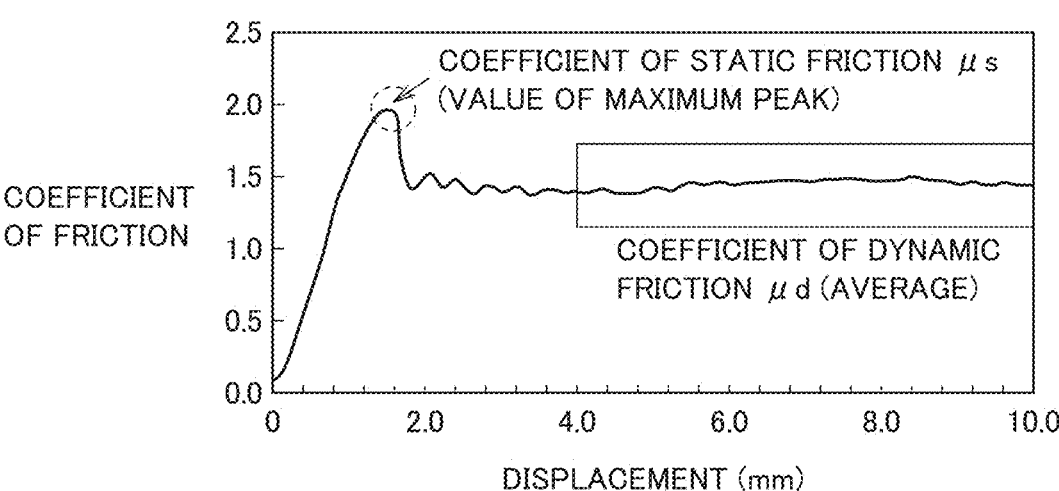
FIG. 5 is a schematic view illustrating the definition of coefficient of static friction and coefficient of dynamic friction.
Figure 6:
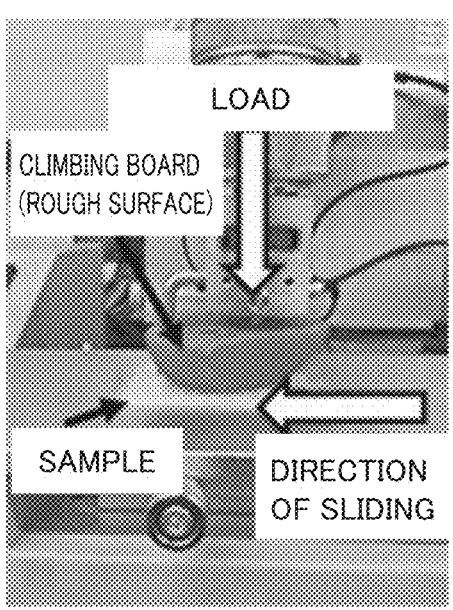
FIG. 6 is a schematic view illustrating the method for measuring coefficient of static friction and coefficient of dynamic friction.

Referring to FIG. 5, the value of the maximum peak of the coefficient of friction which appeared first after the start of the test was determined as the coefficient of static friction based on the results of measurement of the coefficient of friction. The average value of the coefficients of friction for a distance travelled (amount of displacement) of 4 to 10 mm in the direction of sliding of the sample was determined as the coefficient of dynamic friction.

About 10 preliminary tests were performed and the average value of the measured values of the last three tests (N3) in which measured values became stable was determined, and the average value was described in Table 1.

For the <Evaluation of μs, μd> in Table 1, samples with μs≥1.8 and μd≥1.6 were rated as A and samples other than those were rated as B.

The results of the above evaluation are shown in Table 1.

The results of measurement of Tg are also shown in FIG. 2. Referring to FIG. 2, Tg (the maximum value of the peak of tan δ) is no more than 10° C. in Examples 1, 2 and Comparative Example 2. By contrast, Tg is more than 10° C. in Comparative Example 1.

Figure 3:
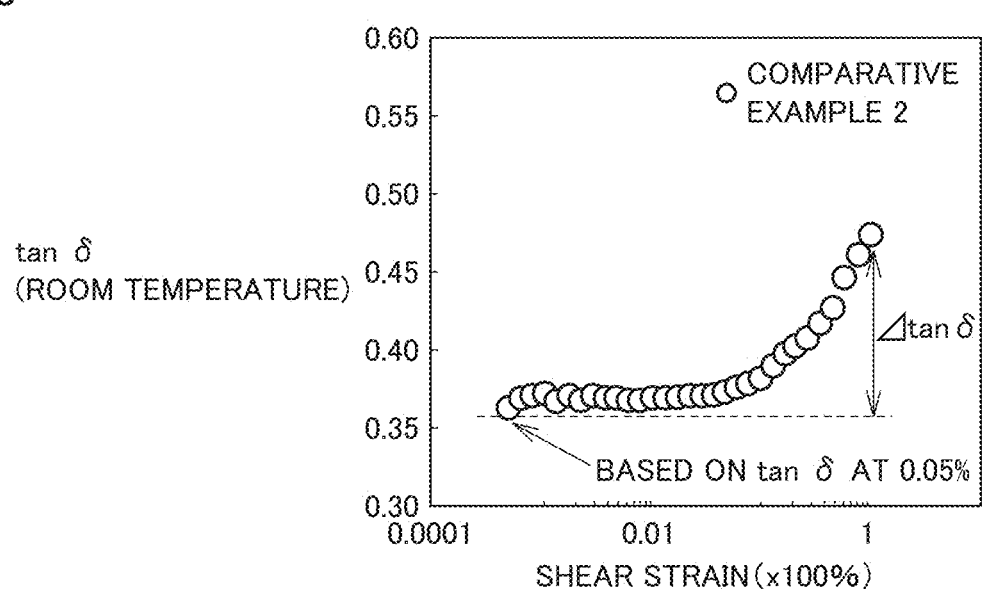
FIG. 3 is a graph showing the relation between shear strain and tan $\delta$ of the material of Comparative Example 2.
Figure 4:
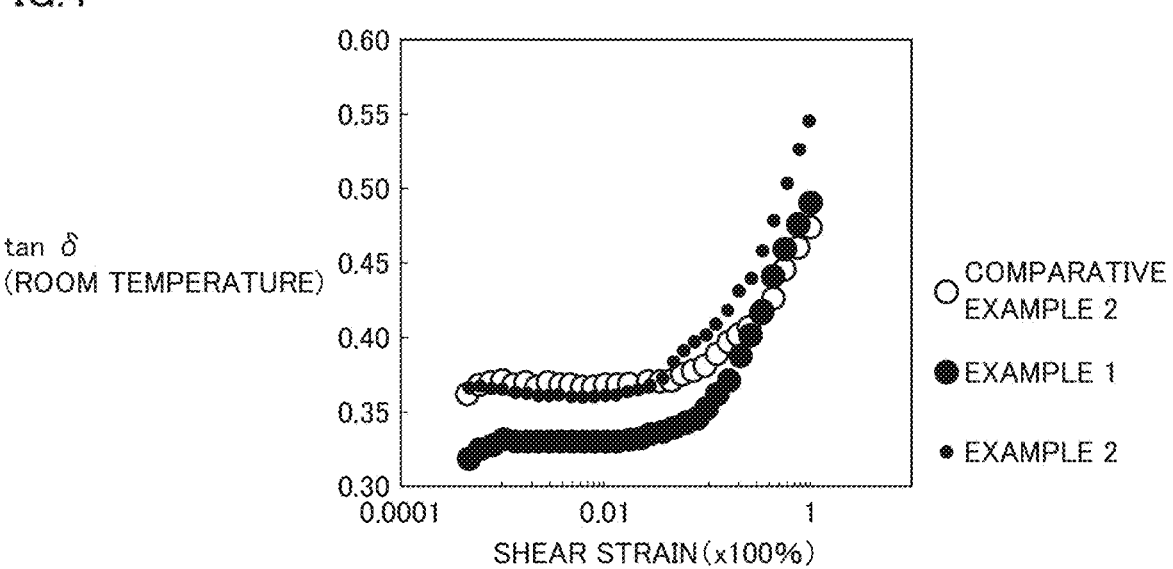
FIG. 4 is a graph showing the relation between shear strain and tan $\delta$ of the materials of Examples 1, 2 and Comparative Example 2.

Furthermore, FIG. 3 and FIG. 4, which illustrate calculation of Δ tan δ, show that Δ tan δ is larger in Examples 1 and 2 than in Comparative Example 2 (in which Tg is no more than 10° C.).

The results in Table 1 show that the shoe members of Examples 1 to 3 having a Tg of no more than 10° C., a tan δ of no less than 0.4 and a Δ tan δ of no less than 0.15 have both excellent static friction properties and excellent dynamic friction properties (μs≥1.8 and μd≥1.6).

By contrast, the shoe members of Comparative Examples 1 to 4 in which any of Tg, tan δ and Δ tan δ is out of the above range do not have excellent static friction properties or dynamic friction properties.

It has been found that in Comparative Examples 3 and 4 in which tan δ is less than 0.4, the coefficient of dynamic friction is smaller than those in Examples.

Furthermore, when liquid rubber is included as in Examples 2 and 3, the complex modulus of elasticity can be increased, and this further improves the coefficient of static friction of the shoe member.

The above embodiments and Examples disclosed in the present description are illustrative in all aspects and not restrictive. The technical scope of the present invention is defined by the claims and all changes coming within the meaning and equivalency range of the claims are intended to be embraced therein.

Furthermore, the characteristic elements disclosed in the above embodiments and Examples can be combined with each other without departing from the spirit of the present invention.

REFERENCE SIGNS LIST

1 Shoe, 10 Upper, 11 Main body of upper, 12 Tongue of shoe, 13 Toe reinforcing part, 14 Heel reinforcing part, 15 Eyelet reinforcing part, 16 Shoelace, 20 Sole, 20a Upper surface, 20b Contact surface.

The invention claimed is:

1. A shoe member comprising a material comprising a thermoplastic elastomer, wherein the material has a glass transition temperature Tg of no more than 10° C., a loss tangent tan δ of no less than 0.4 in a test of dynamic viscoelasticity, and a Δ tan δ, which is the amount of change of tan δ, of no less than 0.15 when strain is changed from 5% to 100%.

TABLE 1

| Composition | Example 1 | Example 2 | Example 3 | Comparative Example 1 | Comparative Example 2 | Comparative Example 3 | Comparative Example 4 |
|---|---|---|---|---|---|---|---|
| SEPS [HYBRAR7125F] | 83 | 75 | 64 | — | 100 | — | — |
| SEEPS [SEPTON4033] | 17 | 15 | 13 | — | — | — | — |
| SEBS [S.O.E L1609] | — | — | — | 100 | — | — | — |
| SEBS [TAFTEC H1052] | — | — | — | — | — | 100 | — |
| SEBS [TAFTEC H1053] | — | — | — | — | — | — | 100 |
| Liquid SBR [L-SBR-820] | — | 10 | 23 | — | — | — | — |
| Cross-linking agent [DCP] | — | — | 0.2 | — | — | — | — |
| Tg (° C.) | 0.0 | 0.2 | 2.7 | 25.2 | 4.2 | −36.3 | −42.3 |
| tanδ | 0.50 | 0.46 | 0.48 | 1.21 | 0.63 | 0.07 | 0.05 |
| Δtanδ | 0.169 | 0.175 | 0.177 | −0.119 | 0.111 | 0.129 | 0.186 |
| E* (MPa) | 4.84 | 11.9 | 16.4 | 55.7 | 4.30 | 6.04 | 51.4 |
| Specific gravity | 0.91 | 0.91 | 0.92 | 1.01 | 0.91 | 0.89 | 0.91 |
| Coefficient of static friction μs | 1.86 | 1.90 | 1.99 | 1.97 | 1.70 | 1.16 | 1.00 |
| Coefficient of dynamic friction μd | 1.72 | 1.70 | 1.65 | 1.10 | 1.60 | 1.21 | 1.11 |
| Evaluation of μs, μd | A | A | A | B | B | B | B |

2. The shoe member according to claim 1, wherein the material does not include a filler or the content of the filler is no more than 10 parts by mass per 100 parts by mass of the thermoplastic elastomer.

3. The shoe member according to claim 1, wherein the thermoplastic elastomer is a styrene thermoplastic elastomer or a thermoplastic polyurethane.

4. The shoe member according to claim 1, wherein the material comprises a viscous liquid.

5. The shoe member according to claim 1, wherein the shoe member has a coefficient of static friction of no less than 1.8 and a coefficient of dynamic friction of no less than 1.6.

6. The shoe member according to claim 1, wherein the shoe member is transparent or semi-transparent.

7. The shoe member according to claim 1, wherein the shoe member can be used as an outsole of a shoe.

8. A shoe comprising the shoe member according to claim 1 as an outsole.

* * * * *